United States Patent [19]

Schäfer et al.

[11] 4,361,611

[45] Nov. 30, 1982

[54] PROCESS FOR PROVIDING SYNTHETIC TEXTILE FABRICS WITH AN ANTISTATIC FINISH

[75] Inventors: Paul Schäfer, Riehen, Switzerland; Fritz Mayer, Weil am Rhein, Fed. Rep. of Germany; Jürg Kündig, Reinach, Switzerland

[73] Assignee: Ciba-Geigy Corporation, Ardsley, N.Y.

[21] Appl. No.: 214,826

[22] Filed: Dec. 10, 1980

[30] Foreign Application Priority Data

Dec. 20, 1979 [CH] Switzerland ............... 11316/79

[51] Int. Cl.$^3$ ............... B32B 7/00; B05D 3/02
[52] U.S. Cl. ............... 428/96; 427/393.1; 428/267; 524/130; 524/145
[58] Field of Search ............... 427/393.1; 428/267, 428/288, 290, 95–97; 260/29.7 P, 30.6 R; 524/130, 145

[56] References Cited

U.S. PATENT DOCUMENTS

| 2,974,066 | 3/1961 | Klingenberg et al. | 428/267 |
|---|---|---|---|
| 3,689,355 | 9/1972 | Hornbeken et al. | 428/267 X |
| 4,135,879 | 1/1979 | Hasenclever | 427/393.1 |

FOREIGN PATENT DOCUMENTS

| 1469427 | 1/1969 | Fed. Rep. of Germany | 428/267 |
|---|---|---|---|
| 2264121 | 10/1975 | France | 428/267 |
| 369255 | 6/1963 | Switzerland | 428/267 |
| 869086 | 5/1961 | United Kingdom | 428/267 |
| 1042904 | 9/1966 | United Kingdom | 428/267 |

OTHER PUBLICATIONS

Textilbetrieb, vol. 91, Dec. 1973, "Photophorsäure ester-Spezial Produkte für Synthesefaser Material", pp. 55–56.

*Primary Examiner*—Michael R. Lusignan
*Attorney, Agent, or Firm*—Edward McC. Roberts

[57] ABSTRACT

A process for providing textile fabrics, especially polyamide carpeting, with an antistatic finish. The process comprises treating the fabrics with an aqueous film-forming preparation which contains an acid ester of phosphoric acid or phosphorous acid, said ester being derived from an aliphatic diol having an average molecular weight of 400 to 2600, wherein the diol is unetherified or etherified by $C_1$–$C_4$-alkoxy.

11 Claims, No Drawings

PROCESS FOR PROVIDING SYNTHETIC TEXTILE FABRICS WITH AN ANTISTATIC FINISH

The present invention relates to a method of providing synthetic textile fabrics with an antistatic finish. The process comprises coating the textile fabrics with an aqueous film-forming preparation which contains an acid ester of phosphorous acid or, preferably, phosphoric acid, said ester being derived from an aliphatic diol having an average molecular weight of 400 to 2600 which is optionally monoetherified by $C_1$-$C_4$-alkoxy.

The acid ester to be used in the process of this invention is conveniently synthesised from 1 mole of a diol with 0.5 to 2 moles, preferably 1 to 2 moles, of phosphorous acid or, preferably, phosphoric acid.

The acid groups of the acid esters can exist in the form of the free acid or of a water-soluble salt, e.g. an alkali metal salt or ammonium salt. Preferred alkali metal salts are the sodium or potassium salt, and the preferred ammonium salts are the ammonium, trimethylammonium, monoethanolammonium, diethanolammonium and triethanolammonium salt.

The acid ester is preferably derived from a free or monoetherified diol of the formula

$$HO-(CH_2-CH_2-O)_{\overline{n}}Z \qquad (1)$$

wherein Z is hydrogen or alkyl of 1 to 4 carbon atoms, and n is an integer from 10 to 40. The diol is preferably unetherified. Examples of such diols are polyethylene glycols having an average molecular weight of 450 to 2200, preferably 550 to 1800. A suitable $C_1$-$C_4$ monoalkyl ether of a diol of the formula (1) is, in particular, the corresponding monomethyl or monoethyl ether.

The acid esters to be used in the practice of this invention are obtained by known methods. One method consists in reacting the diol with ortho-phosphoric acid or ortho-phosphorous acid, or an anhydride thereof, and, if desired, converting the product into a salt. The reaction with the acids is conducted advantageously in the temperature range from 80° to 200° C., preferably from 140° to 180° C. When using an acid anhydride, it is advantageous to react this with the diol in the temperature range from 0° to 30° C.

It is not necessary to employ a solvent to carry out the reaction. If desired, however, it is also possible to use solvents such as benzene, toluene, xylene, carbon tetrachloride, chloroform, chlorobenzene, nitrobenzene, or other inert solvents.

The acid esters to be used in the process of the invention are conveniently present in the aqueous preparation in an amount of 0.2 to 10% by weight, preferably 0.5 to 6% by weight, based on the solids content of the preparation.

The invention also relates to an aqueous preparation for carrying out the antistatic finishing process, and also to the synthetic textile fabric provided with an antistatic finish.

In addition to containing the phosphorous acid ester or phosphoric acid ester as defined herein, the preparation employed in the practice of this invention advantageously contains in addition an aqueous latex of synthetic polymers which act as binders and film-forming coating materials, as well as a filler.

Suitable synthetic polymers which can be used are: polyethylene, polypropylene, polybutadiene, polymethacrylate, polyethylacrylate, polystyrene, polyvinyl acetates, polyvinyl chloride, polyvinyl pyrrolidone, carboxylated polyvinyl acetates, and, in particular, copolymers of butadiene and styrene, or, most preferably, carboxylated copolymers of butadiene and styrene.

Examples of suitable fillers are finely dispersed silica, silicates, bentonite, kaolins, titanium dioxide, aluminium hydroxide, satin white and, in particular, calcium carbonate.

The preparations of the invention preferably have a solids content of about 50 to 90% by weight, preferably 60 to 80% by weight.

The content of aqueous latex in the preparation of the invention can be about 30 to 60% by weight, preferably 40 to 50% by weight, and the amount of filler can be 100 to 500% by weight, preferably 200 to 400% by weight, based on the solids content of the latex.

The aqueous preparations can contain, as additional ingredients, e.g. an acid, especially a low molecular organic acid such as formic acid or acetic acid, or a base such as an alkali metal hydroxide, ammonium hydroxide or a lower alkanolamine for adjusting the pH, a thickener, a plasticiser, a solvent or an antifoam. The pH value of the preparations can be in the range from 6 to 10, but is advantageously from 7 to 9 and, preferably, from 7.5 to 8.5. If desired, further finishing agents can also be applied to the textile fabrics simultaneously with the antistatic preparation, e.g. antimicrobial agents or dirt repellents.

Suitable synthetic textile fabrics which can be treated by the process of the present invention are for example those made from polyamide, polyester, polyacrylonitrile or polyolefins, and blends thereof. Polyamide textile fabrics are preferred. The textile fabrics made from the above types of fibrous material can be undyed or preferably dyed and are advantageously in the form of flocks, tops, wovens, knits, non-wovens, yarn or piece goods. Examples of piece goods are in particular, floor coverings, for example tufted carpets, or other domestic textiles, such as upholstery fabrics, curtains or wall coverings. The finishing of carpet fabrics, in particular those made from synthetic polyamide, is preferred. In this connection, it must be borne in mind that often the electrical conductivity of the pile fabric is ensured either by chemical treatment (finishing) or by a blend of carbon fibres or by a blend of metallised synthetic fibres or metallic fibres.

The finishing of the textile fabrics is advantageously carried out by spraying, impregnating, slop-padding or coating. This treatment is preferably carried out at room temperature or slightly elevated temperature (in the range from about 15° to 40° C.). For this treatment it is possible to use aqueous preparations which contain the acid esters in the form of aqueous emulsions or dispersions.

The treated textile fabrics can be dried in the temperature range from 20° to 80° C., with the preferred range being from 80° to 130° C., e.g. with an infra-red preheating zone and with subsequent foam coating and jet drying. The textile fabrics can then be stored, if desired, for 12 to 48 hours at room temperature.

In the practice of the present invention, a mixture consisting of the organic phosphoric acid ester defined herein, a polymer latex and a filler is coated uniformly, in the form of an aqueous dispersion, onto the wet or dry textile fabric to be treated in an amount (e.g. 100 to 500% by weight, based on the fabric) such that a sufficient layer remains on the surface of the fabric after drying the latter in the temperature range from 80° to 120° C., in order that the desired antistatic effect is achieved.

The treated textile fabrics, in particular carpets, exhibit good antistatic effects, i.e. no troublesome discharges arise on coming into contact with or treating on them. Furthermore, the handle and fastness to rubbing, and the lightfastness of dyed fabrics, are not adversely affected by the finish. The finishes on carpets are fast to shampooing and are also not adversely affected by brushing, vacuum cleaning, or extraction with hot water.

The coating pastes are scarcely changed in their flow properties. Furthermore, the coating with the antistatic components dries as rapidly as without antistatic agents. The fibrillation strength and tuft anchorage are not decisively changed by the addition of the antistatic agents. The flexural strength of the coating and its good resistance to ageing, as well as the adhesiveness of the foam layer, are also not adversely affected.

The following preparatory methods and application Examples illustrate the invention and show that textile fabrics with improved antistatic properties are obtained by treating said fabrics by the process of this invention. The antistatic action is measured in volts (to determine the electrostatic charge) or in ohms (to determine the surface resistance). The susceptibility limit for humans is 3000 volts (Modern Textiles Magazine, January 1972, J. A. Gusack, Williamsburg, Va, USA) or $10^{10}$–$10^{11}$ ohms, measured with ring electrodes in accordance with the test method of DIN 54345.

PREPARATORY METHODS

Method A

With stirring, 60 g of polyethylene glycol (average mol. wt. 600) and 11.5 g of 85% phosphoric acid are heated for 3 hours to 170° C., during which time small amounts of water are distilled off. The reaction mixture is kept for a further hour at 170° C. under a water jet vacuum, then cooled to 40° C. The reaction product is diluted with 21 g of water to a solids content of 75% by weight, affording a fluid brown solution with a viscosity of 143 mPas.

Method B

With stirring, 150 g of polyethylene glycol (average mol. wt. 1500) and 11.5 g of 85% phosphoric acid are heated for 3 hours to 170° C., during which time small amounts of water are distilled off. The reaction mixture is kept for a further hour at 170° C. under a water jet vacuum, then cooled to 40° C. The reaction product is diluted with 50 g of water to a solids content of 75% by weight, affording a brown solution with a viscosity of 293 mPas.

Method C

With stirring, 150 g of polyethylene glycol (average mol. wt. 1500) and 23 g of 85% phosphoric acid are heated for 3 hours to 170° C., during which time small amounts of water are distilled off. The reaction mixture is kept for a further 4 hours at 170° C. under a water jet vacuum, then cooled to 40° C. The reaction product is diluted with 55 g of water to a solids content of 75% by weight, affording a brown solution with a viscosity of 293 mPas.

Method D

While cooling, 14.2 g of phosphorus pentoxide are added at room temperature to 60 g of polyethylene glycol (average mol. wt. 600). When the exothermic reaction is complete, the reaction mixture is kept for 2 hours at 60° C., then 20 g of water are added and the pH value is adjusted to 7 with ethanolamine. The reaction product is then diluted with water to a solids content of 75% by weight, affording a brownish solution with a viscosity of 439 mPas.

Method E

While cooling, 14.2 g of phosphorus pentoxide are added to 150 g of polyethylene glycol monomethyl ether (average mol. wt. 750). When the exothermic reaction is complete, the reaction mixture is kept for 2 hours at room temperature and then for 2 hours at 60° C. After cooling to room temperature, the acid phosphoric acid ester is neutralised with 30% sodium hydroxide solution to pH 7–7.8 and diluted with water to a solids content of 75% by weight. The yellow solution obtained has a viscosity of 236.7 mPas.

Method F

With stirring, 150 g of polyethylene glycol monomethyl ether (average mol. wt. 750) and 16.4 g of phosphorous acid are heated for 3 hours to 170° C., during which time small amounts of water are distilled off. The reaction mixture is kept for a further 2 hours at 170° C. under a water yet vacuum, then cooled to room temperature. The acid reaction product is neutralised with ethanolamine to pH 7–7.8 and diluted with water to a solids content of 75% by weight. The yellow solution obtained has a viscosity of 131 mPas.

Method G

The procedure described in Method F is repeated, substituting 120 g of polyethylene glycol (average mol. wt. 600) for the 150 g of polyethylene glycol monomethyl ether. The yellow solution obtained has a viscosity of 161.2 mPas.

Method H

While cooling, 14.2 g of phosphorus pentoxide are added to 180 g of polyethylene glycol (average mol. wt. 600). When the exothermic reaction is complete, the reaction mixture is kept for 2 hours at room temperature and for 2 hours at 60° C. After cooling to room temperature, the acid phosphoric acid ester is neutralised with ethanolamine to pH 7–7.8 and diluted with water to a solids content of 75% by weight. The yellow solution obtained has a viscosity of 205.2 mPas.

Method J

With stirring, 120 g of polyethylene glycol (average mol. wt. 600) and 15 g of 85% phosphoric acid are heated for 3 hours to 170° C., during which time small amounts of water are distilled off. The reaction mixture is kept for a further hour at 170° C. under a water jet vacuum. After cooling to room temperature, the acid phosphoric acid ester is neutralised with ethanolamine to pH 7–7.8 and diluted with water to a solids content of 75% by weight. The yellow solution obtained has a viscosity of 138.5 mPas.

Method K

In the same manner as described in Method H, 96 g of polyethylene glycol (average mol. wt. 600) and 5.7 g of phosphorus pentoxide are reacted, with the difference that the acid phosphoric acid ester is neutralised with aqueous concentrated ammonia instead of ethanolamine. The slightly yellowish solution obtained has a viscosity of 164.8 mPas.

APPLICATION EXAMPLES

Example 1

Each of a number of polyamide carpets, backed with polypropylene tape fabric, is coated with 1000 g per square meter of a mixture consisting of 500 parts of a 40% aqueous solution of a butadiene/styrene copolymer, 20 parts of the phosphoric acid ester obtained in Method A, and 300, 400 and 500 parts respectively of calcium carbonate. The coated carpets are then dried for 20 minutes at 90° C., then left for 24 hours at 23° C. and 25% relative humidity. The electrical surface resistance of the three coats is then measured with a ring electrode. The respective surface resistance is $8.10^{12}$ ohms (with 300 g of calcium carbonate), $4.10^{12}$ ohms (with 400 parts of calcium carbonate) and $5.10^{11}$ ohms (with 500 parts of calcium carbonate). Without the addition of the phosphoric acid ester, the surface resistance of the carpeting is in each case $10^{14}$ ohms. Instead of using the phosphoric acid ester of Method A, it is also possible to use the acid esters obtained in Methods B, C and D.

Example 2

A tufted carpet with looped pile and backed with polypropylene tape fabric is coated with 1000 g per square meter of a 50% aqueous solution of a butadiene/styrene copolymer, 200 parts of calcium carbonate and 6 parts of the phosphoric acid ester obtained in Method B. The coated carpet is dried for 30 minutes at 90° C. and then left for 24 hours at 23° C. and 25% relative humidity. The surface resistance of the coated carpet is $10^{11}$ ohms, measured with a ring electrode.

The surface resistance of the carpet without addition of phosphoric acid ester is $10^{14}$ ohms.

Examples 3 to 8

Polyamide tufted carpet is coated with 1000 g per square meter of a mixture consisting of 100 parts of a 50% aqueous solution of a butadiene/styrene copolymer, 200 parts of calcium carbonate and 6 parts of one of the phosphoric or phosphorous acid esters obtained in Methods E to K. The coated carpet is dried for 60 minutes at 105° C., then left for 24 hours at 20° C. and 25% relative humidity. The surface resistance is measured 24 hours later with a ring electrode. The results are reported in Table 1.

TABLE 1

| Example | Phosphoric or phosphorous acid ester according to Method | Resistance in ohms |
|---|---|---|
| 3 | E | $2 \times 10^{10}$ |
| 4 | F | $10^{10}$ |
| 5 | G | $5 \times 10^9$ |
| 6 | H | $10^9$ |
| 7 | J | $3 \times 10^9$ |
| 8 | K | $2 \times 10^9$ |
|  | without addition of ester | $10^{15}$ |

Examples 9 to 14

0.5 g of each of the phosphoric or phosphorous acid esters prepared according to Methods E to K is dissolved in water and polyacrylonitrile fabric having a weight of 200 g/m² is padded with these solutions to a liquor pickup of 120%. The fabric is then dried for 40 minutes at 90° C. and left for 48 hours at 23° C. and 50% relative humidity. The surface resistance is then measured with a ring electrode. The results are reported in Table 2.

TABLE 2

| Example | Phosphoric or phosphorous acid ester according to Method | Resistance in ohms |
|---|---|---|
| 9 | E | $4 \times 10^{10}$ |
| 10 | F | $2 \times 10^{10}$ |
| 11 | G | $8 \times 10^{10}$ |
| 12 | H | $4 \times 10^{10}$ |
| 13 | J | $3 \times 10^{10}$ |
| 14 | K | $2 \times 10^{10}$ |
|  | without addition of ester | $>10^{15}$ |

Examples 15 to 17

2 g of each of the phosphoric or phosphorous acid esters prepared according to Methods E, F and H is dissolved in 98 g of water and polyester knitted fabric having a weight of 225 g/m² is padded with these solutions. The fabric is dried for 60 minutes at 30° C. and then left for 48 hours at 23° C. and 50% relative humidity. The surface resistance is then measured with a ring electrode. The results are reported in Table 3.

TABLE 3

| Example | Phosphoric or phosphorous acid ester according to Method | Resistance in ohms |
|---|---|---|
| 15 | E | $6 \times 10^{11}$ |
| 16 | F | $6 \times 10^{11}$ |
| 17 | H | $10^{12}$ |
|  | without addition of ester | $10^{15}$ |

Example 18

5 g of the phosphorous acid ester prepared according to Method F are dissolved in 1 liter of water. A polyamide 66 knitted fabric having a weight of 260 g/m² is padded with 80% by weight of this solution, dried for 60 minutes at 90° C., and then left for 24 hours at 23° C. and 25% relative humidity. The surface resistance is $3 \times 10^{11}$ ohms, measured with a ring electrode. Without addition of the phosphorous acid ester, the surface resistance is $10^{15}$ ohms.

What is claimed is:

1. A process for providing a synthetic textile fabric with an antistatic finish, comprising the step of coating said fabric with an aqueous film-forming preparation which contains a phosphoric or phosphorous acid ester of an alcohol of the formula

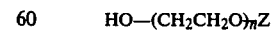

$$HO-(CH_2CH_2O)_n Z$$

wherein Z is hydrogen or alkyl of 1 to 4 carbon atoms, and n is 10 to 50.

2. A process according to claim 1, wherein the acid ester is in the form of an alkali metal salt or of an ammonium salt.

3. A process according to claim 1, wherein Z is hydrogen.

4. A process according to claim 3, wherein the alcohol is a polyethylene glycol having an average molecular weight of 550 to 1800.

5. A process according to claim 1, wherein the acid ester is an acid ester of phosphoric acid.

6. A process according to claim 5, wherein the acid ester of phosphoric acid has been obtained with 0.5 to 2 moles of phosphoric acid, or the corresponding equivalent of phosphoric anhydride per mole of alcohol.

7. A process according to claim 1, wherein the acid ester is present in the aqueous preparation in an amount of 0.2 to 10% by weight, based on the solids content of said preparation.

8. A process according to claim 1, wherein the aqueous preparation additionally contains a latex of synthetic polymers, and a filler.

9. A process according to claim 1, wherein the aqueous preparation has a solids content of 50 to 90% by weight.

10. A process according to claim 1, wherein the treated textile fabric is dried in the temperature range from 80° to 130° C.

11. A process according to claim 1, wherein the textile fabric is carpeting made of synthetic polyamide.

* * * * *